United States Patent [19]

Hubbs, Jr. et al.

[11] Patent Number: 4,827,665

[45] Date of Patent: May 9, 1989

[54] SOIL CONDITIONING PRODUCT AND PROCESS

[76] Inventors: James J. Hubbs, Jr., 1939 E. Apollo, Tempe, Ariz. 85254; Jonathan Hubbs, 3131 E. Mulberry, Phoenix, Ariz. 85016

[21] Appl. No.: 383,591

[22] Filed: Jun. 1, 1982

[51] Int. Cl.$^4$ ............................................. A01G 7/00
[52] U.S. Cl. ............................................. 47/58; 47/9
[58] Field of Search ............... 47/58, DIG. 10, 9, 1 R

[56] References Cited

U.S. PATENT DOCUMENTS 3,696,559  10/1972  Hatton ...................................... 47/9
4,106,296  8/1978  Leonard, Jr. et al. ....... 47/DIG. 10

Primary Examiner—Robert A. Hafer
Attorney, Agent, or Firm—Gregory J. Nelson

[57] ABSTRACT

A method of conditioning soil and an organic soil conditioner particularly useful in treating athletic fields derived by drying and grinding plants from the Plantago family. The soil conditioner is applied to the surface of tilled soil and thereafter worked into the soil, deep-watered, allowed to dry and packed. Time-released fertilizer may be included in the soil conditioner if desired.

5 Claims, 1 Drawing Sheet

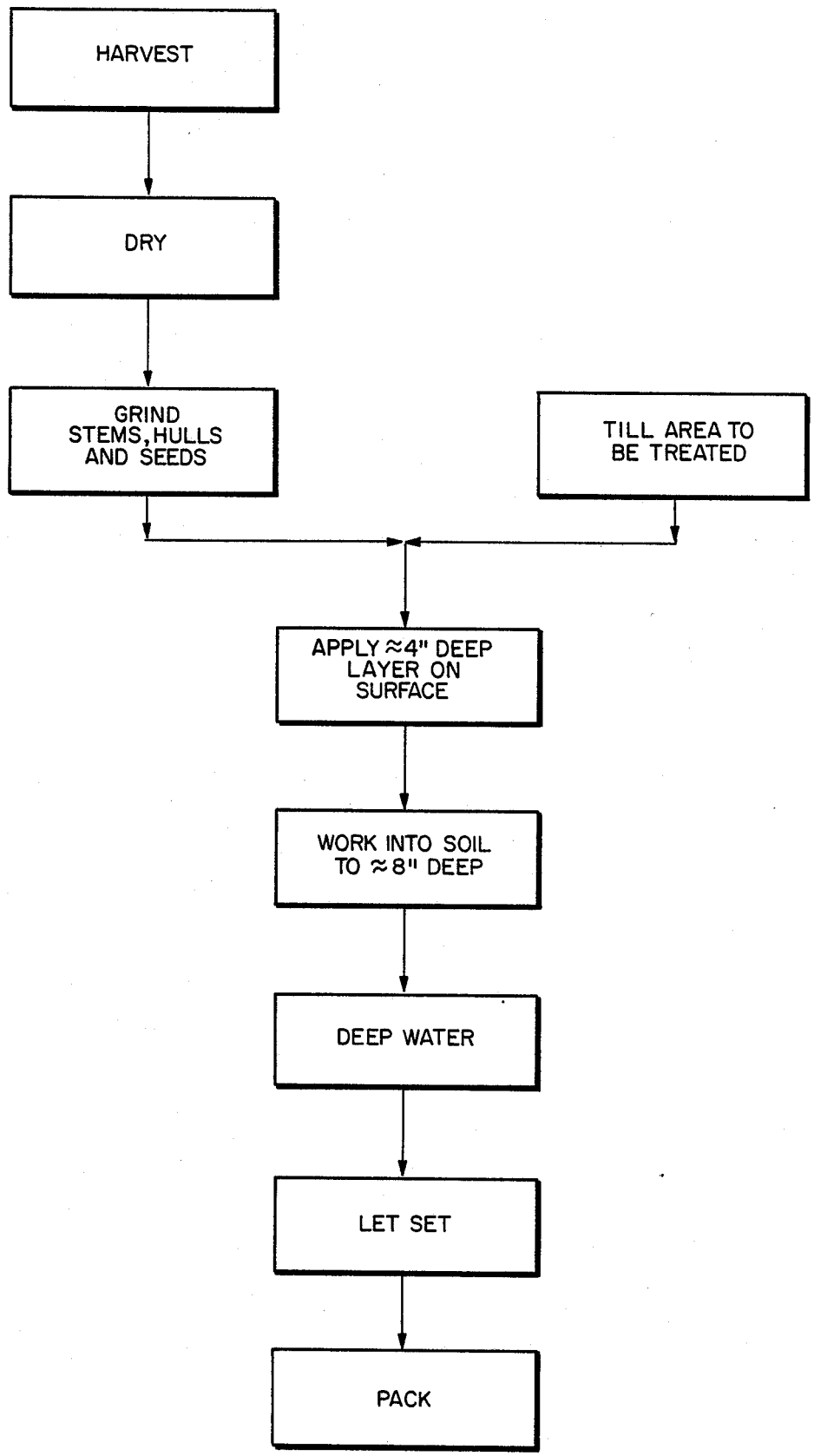

SOIL CONDITIONING PRODUCT AND PROCESS

The present invention relates to a soil conditioner and more particularly relates to a soil conditioner for stabilizing the soil and enhancing the water absorption and retention characteristics of the soil.

The problems of conditioning and stabilizing soils are particularly important in the maintenance of athletic fields. In order for athletic fields to be acceptable for use, the soil must be firm, not subject to blowing or washing away of the surface, and must have good moisture absorption and retention characteristics. Soil that will not quickly absorb and disburse water is a particular problem as fields unplayable as a result of standing water can result in delay of games causing scheduling problems, financial burdens and fan and player disgruntlement. Accordingly, various products and soil treatment processes involving organic components are available in the prior art.

The prior art suggests various approaches to the problem of conditioning soils. For example, U.S. Pat. No. 3,303,609 teaches a method of impeding soil errosion by depositing a cover of hydrophilic cellulose fibers on the soil which have a high water retention characteristic.

U.S. Pat. No. 2,658,824 deals with the production of soil treating agents and with the conditioning of depleted soils by fermenting extracts of various desert plants which extract is applied to the soil. The use of organic materials is also suggested in U.S. Pat. Nos. 2,957,834 and 3,017,720. The former patent suggests a method of stabilizing soil against errosion which comprises dispersing a cold swelling starch which is derived from various natural starches such as potato starch, corn starch, wheat starch and the like on the surface of the soil. The latter patent suggests forming an aqueous slurry consisting essentially of cellulose pulp fibers as a mat over the soil.

Still another approach to providing an agricultural process for ground cover involves spreading a mixture of the mucilage of the plantago seed with mulch, fertilizer, seed and water on the surface of the soil. See U.S. Pat. No. 3,696,559. This patent has been commercially exploited primarily as a means of providing ground cover along highway right-of-way areas.

While various prior art methods and products, including the foregoing, have met with some success in the prior art they generally relate to methods involving an organic product for conditioning the soil and for promoting growth of ground cover and have not worked particularly well in the area of athletic fields. As pointed out above, the absorption and dispersion of water is a particular problem in the treatment of playing fields. Further, any soil conditioner for athletic fields must provide a playing surface that is adequately firm and errosion resistant.

Briefly, the present invention provides an improved soil conditioner for athletic fields. The method according to the present invention involves harvesting the entire seed and part of a plant from the Plantago family. The harvested seed and plant parts are dried and thereafter ground to flour-like consistency to form a soil conditioning agent. The area to be treated is tilled and the conditioner is spread over the surface to a depth of about two to four inches. Thereafter, the soil conditioner is worked into the soil and deep-watered and allowed to dry. The surface is then compacted by rolling or similar method. A time-release fertilizer may be included with the soil conditioner if groundcover or turf is to be planted on the soil surface.

A more complete understanding of the invention will be apparent from the following description, claims and drawings in which:

The drawing figure illustrates in diagram form the method of preparing the soil conditioner and treating soil according to the present invention.

In the practice of the present invention, the soil conditioner is first prepared. The soil conditioner is prepared by first harvesting herbs from the Plantain family (Plantaginaceae). The Plantain family is also described as Plantago and is sometimes known as Indian-Wheat. The plant is described as a generally scapose herb with the foliage leaves all basal; flowers small, perfect or unisexual, regular, in terminal, long-peduncled, bracted spikes; calyx and corolla 4-divided or 4-lobed, persistent, usually scarious or scariuos-margined; stamens 2 or 4, distinct, attached to the corolla tube; style filiform, stigmatic most of its length; ovary superior, 2- to 4-celled; fruit a circumscissile, usually few-seeded capsule. See *Arizona Flora*, by Kearny and Peebles (1951 with Supplement 1960).

There are various species to the plantain family and it has been found that the species *Plantago insularis* found in southern Utah, Nevada, Arizona and southern California works particularly well. The plant is harvested by cutting it at mid-stem and then dried. Drying can be accomplished naturally on drying racks or tables exposed to solar energy or can be accomplished in conventional agricultural dryers. One effective method is to place the harvested plant on sheets of black plastic exposed directly to solar radiation. In normal summer conditions in the South West, drying can be accomplished in about three days.

After the plant is dried, it is ground to a fine powder. Grinding can be accomplished in any number of conventional ways, by using a ball grinder, an auger or screening techniques. Preferably the dried plant is ground to approximately the consistency of ordinary baking flour which is about mesh 150-200. Some inert fillers may be added at this time if desired if additional bulk is required. Typical fillers might be sugar, organic ground material such as seed husk, leaves and stems. The soil conditioner product is now ready for application.

The area to be treated typically would be an athletic playing surface such as the base path of a baseball diamond. These areas are subject to heavy use and in periods of rain must have the ability to quickly absorb and disperse the moisture. Accordingly, the area to be treated is rototilled or otherwise tilled by hand to loosen the soil. Thereafer, the soil conditioner as prepared above is spread over the surface of the area typically to a depth of about two to four inches. The depth of application will vary with the nature of the soil. Soils having a high clay content may require additional amounts of conditioner. The conditioner is then worked into the soil by raking and tilling or harrowing to approximately two to eight inches depth. Preferably, the conditioner is worked until it is uniformly dispersed through the soil layer.

Thereafter, deep watering is applied. For example, approximately ten inches of water should be applied to the soil surface. After watering, the water is allowed to fully permeate the soil. Normally, under ordinary dry conditions, the area is allowed to set for a day or so.

After the water has been allowed to permeate the soil, the surface is compacted by rolling with a pneumatic or heavy-weighted steel faced roller. At this point, the surface is ready for play.

If the soil surface is to support a ground cover, an appropriate time-released fertilizer can be applied at the time the soil conditioner is added.

The soil conditioner of the present invention works well for almost any application where a reduction of compaction, aeration, uniformity of surface and better moisture absorption and retention is required. As mentioned above, athletic fields such as baseball diamonds and golf courses are particularly good applications for the soil conditioning method and product of the present invention. Other similar applications include race tracks, football and soccer fields, clay tennis courts, highway berms and embankments.

In order to test the effectiveness of the present product and process, the process was applied to baseball diamonds base paths and was proven very effective. The soil conditioner of the present invention provides a basically constant playing surface which is particularly important at the professional athletic level. Preliminary tests indicate that the soil conditioner is effective for a long period of time and even under heavy playing conditions, may last for as many as two years. Maintenance costs are reduced as preparation of the field, such as dragging is made easier because of the uniformity and condition of the surface. Further, playing fields are ready for play in a shorter time after heavy rains as compared with untreated fields or fields treated with other methods. The soil conditioner of the present invention appears to have the ability to "pull" the moisture from the surface into the soil and disperse and retain the moisture. Therefore, surface accumulation of water is minimized. In actual tests at the San Francisco Giants minor league camp at Casa Grande, Arizona, a treated field was compared with an untreated field after unusually heavy spring rains. The treated field was ready for play within 15 hours after the rains, whereas, the adjacent untreated field was unplayable for a period of at least 48 hours. The surface of the treated field was uniform and firm while the untreated adjacent field was "goey" and slick and not playable.

While the *Plantago insularis* species is particularly adaptable, other species within the family may be used. These include *Plantago ovata, Plantago purshii,* and *Plantago fastigiata.*

Having described in detail the preferred embodiments of my method for treating soil and the product, a person skilled in the art will be able to make various changes, alterations and modifications while continuing to practice the inventive principles described herein. It is therefore intended that all such modifications and alterations be covered as they are embraced within the spirit and scope of the appended claims.

We claim:

1. A product for conditioning soils comprising the dried and ground plants from the Plantago family.

2. The soil conditioner of claim 1 wherein said plant is *Plantago insularis.*

3. The method of treating soil for better water dispersion and retention comprising:
   (a) tilling the area to be treated;
   (b) applying a surface layer of a soil conditioner comprising the dried, ground plant of the Plantago family;
   (c) tilling the conditioner into the soil;
   (d) deep watering;
   (e) allowing to dry; and
   (f) packing the surface.

4. The method of treating the soil set forth in claim 3 further including application of a time-release fertilizer to the surface prior to tilling the conditioner into the soil.

5. The method of claim 3 wherein said soil conditioner comprises the ground seed, plants and part of the stem of the species *Plantago insularis.*

* * * * *